F. A. HUGHES.
POTATO GATHERING ATTACHMENT.
APPLICATION FILED JAN. 3, 1910.
963,766.
Patented July 12, 1910.
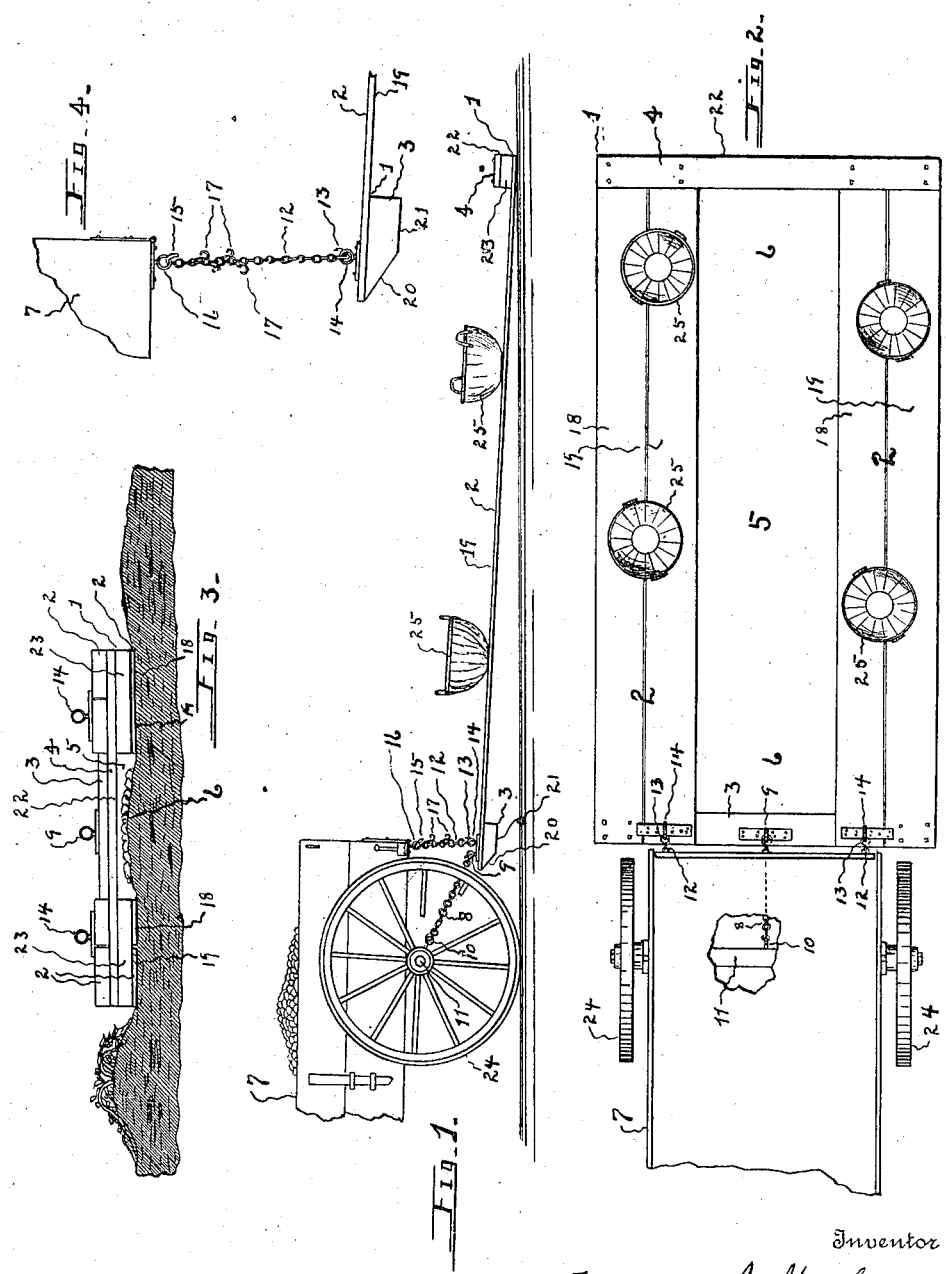
Witnesses
C. G. Somers
H. C. Compton.
Inventor
Frederick A. Hughes,
By Hiram A. Sturges,
Attorney

UNITED STATES PATENT OFFICE.

FREDERICK A. HUGHES, OF MAZA, NORTH DAKOTA.

POTATO-GATHERING ATTACHMENT.

963,766.  Specification of Letters Patent.  Patented July 12, 1910.

Application filed January 3, 1910. Serial No. 536,123.

*To all whom it may concern:*

Be it known that I, FREDERICK A. HUGHES, a citizen of the United States, residing at Maza, in the county of Towner and State of North Dakota, have invented certain new and useful Improvements in Potato-Gathering Attachments, of which the following is a specification.

This invention relates to a potato-gathering attachment, especially useful in connection with potato diggers, and has for its object, broadly, to provide a follower which will be composed of few parts so that it may be economically constructed, and which may be attached to a cart, wagon or other conveyance to be drawn along the potato row, and having side-portions or supports disposed at the sides of the row, while in operation, the potatoes to be gathered and which are lying scattered upon the ground between the side-portions, to be collected manually by operators while riding, and while the follower is moving.

The invention has reference to a platform formed with a middle opening to provide longitudinal side portions sufficiently large to accommodate the workmen and the baskets or other receptacles used by them, the side portions at their rear ends being connected by an intervening arch or elevated part so that potato vines or weeds will not accumulate, their front ends being connected and supported adjustably at a suitable altitude above the ground.

The invention consists of the novel combination and arrangement of parts as described herein and claimed, and as illustrated in the drawing, it being understood that changes in form, size, proportion and minor details may be made within the scope of the claims without departing from the spirit of the invention, or sacrificing any of its advantages.

In the accompanying drawing forming a part of the application, Figure 1 is a side view of a potato-gathering attachment shown connected with a wagon, and embodying my invention. Fig. 2 is a plan view of the same, the bottom of the wagon box being partly broken away. Fig. 3 is a view of the rear end of the attachment, a section of earth being added to illustrate relative position of potato rows and the side portions of the platform. Fig. 4 is an enlarged detail to clearly show adjustable means for supporting the front end of the device.

Referring now to the drawing for a more particular description, numeral 1 indicates a float or platform, comprising side portions 2 connected respectively at their front and rear ends by cross pieces 3 and 4, and providing therebetween the well, aperture or longitudinal opening 5.

The platform may be of any suitable length or shape, but, preferably, it is rectangular in form. Side-portions or sections 2 may be of any suitable form, but, preferably they are rectangular and are disposed parallel with reference to each other. They should be of adequate width so that workmen may have sufficient space to ride thereon and may manually pick up potatoes which lie upon the ground in the potato row 6, the same to be deposited in baskets 25 or other suitable receptacles, said side portions, during operation, being disposed between the potato rows.

Opening 5 extends between the side pieces almost the entire length of the device, and this opening should have an adequate width so that the potatoes of a row when dug, and which always lie scattered upon the ground or row, will be accessible, and may be collected from the area between these side portions.

The device may be drawn by any suitable vehicle or movable support, a wagon 7 being herein indicated for this purpose; and its front end may be sustained at a suitable altitude above the ground and it may be connected to the vehicle by any convenient means, the means herein shown, in part, being a main draft-member or chain 8. The lower end of member 8 may be connected with eye bolt 9 mounted upon and at the middle of the front cross piece 3, its upper end being connected with eye bolt 10, the latter being secured midway of axle 11 of the vehicle.

At 12 are indicated supporting-members or chains provided at their lower ends with hooks 13 which may engage eye bolts 14 secured near the ends of plate or cross-piece 3, substantially at equal distances from eye bolt 9, their upper ends being provided with hooks 15 which may engage eye-bolts 16, the latter being secured upon the rear end of the vehicle; and supporting-chains 12 may be provided at longitudinal intervals with hooks 17, any of which may be connected with eye bolts 16, whereby the front end of the platform may be supported at higher or lower altitudes from the ground, as may be desired.

Side-portions 2 are preferably formed of wooden strips 18 and 19, so that they will have an increased degree of resiliency, as compared with integral structures, and thereby the device may move or slide with less vibration, and the attachment or device as described is very convenient in use for the purposes mentioned.

Where the ground is rough or considerably obstructed by weeds or the like, the front end of the device may be elevated by means of adjusting-hooks 17, and plate or cross-piece 3 may be formed with a front facet 20 inclined upwardly and forwardly from its lower surface 21 so that it will be less obtrusive to obstructions, when the platform is moving forwardly.

The rear end of the device is provided with the arch 22, whereby cross-piece 4 is elevated above side-portions 2, so that surface obstructions upon the ground will not be accumulated by this part of the platform. The arch may be conveniently formed or constructed by use of spacing-blocks 23 seated between cross-piece 4 and the side portions, and secured to these parts by any convenient means.

In operation, when the vehicle moves forwardly, wheels 24 being then upon each side of a potato row from which the potatoes have been dug, the device will be drawn as already described; the side-portions will be disposed downwardly-inclined from their front to their rear ends, said rear ends resting or sliding upon the ground at the sides of the potato row, and as is apparent, the potatoes may be gathered manually from the ground within the area between side-portions or sections 2 of the platform, and may at that time be conveniently assorted by operators, while conveyed by the device.

Having fully described my invention, what I claim and desire to secure by Letters Patent is,—

1. A potato-gathering device, comprising a rectangular, longitudinally movable platform formed with longitudinal side-portions and an intermediate opening, the side-portions adapted to be disposed at the sides of a potato row, one end of the platform being formed as an arch, and means to maintain the opposite end of the platform above the potato row.

2. A potato-gathering device, comprising a rectangular, longitudinally movable platform formed with longitudinal side-portions with an opening therebetween; said side-portions adapted to be disposed at the sides of a potato row, one end of the platform being formed as an arch and adapted to overhang the potato-row; and means to maintain the opposite end of the platform adjustably at different altitudes above the potato row.

3. In a potato-gathering device, the combination with a movable support, of a rectangular platform having longitudinal side-portions secured together at their ends and providing an intermediate opening, the front end of the platform being secured to the support at an altitude above the ground and overhanging a potato row, the rear ends of the side-portions being seated upon the ground at the sides and provided with an arch overhanging said potato-row.

4. A device for gathering potatoes disposed in rows, comprising a rectangular platform with substantially parallel, adjacent side-portions and transverse end-portions, said platform adapted to be moved longitudinally of a potato row, its side portions being disposed at the sides and its transverse end-portions overhanging said row; and means to maintain the front end of the platform at an altitude above the ground.

5. A device for gathering potatoes disposed in rows, comprising a rectangular platform with substantially parallel, adjacent side-portions and transverse end-portions, said platform adapted to be moved longitudinally of a potato row, its transverse end-portions being disposed above and its side-portions being disposed at the sides of said row, and means to dispose and maintain one end of the platform adjustably at different degrees of elevation above the potato row.

6. In a device for gathering potatoes disposed in rows, the combination with a vehicle, of a platform comprising parallel, adjacent side-portions adapted to be disposed at the sides of a potato row and having their adjacent ends connected by transverse cross-pieces; and flexible members connected with the platform and with said vehicle and operating to maintain one end of said platform above a potato row.

In testimony whereof I have affixed my signature in presence of two witnesses.

FREDERICK A. HUGHES.

Witnesses:
HARRY LORD,
A. H. BRADLEY.